(12) United States Patent
Konanur et al.

(10) Patent No.: US 11,949,170 B2
(45) Date of Patent: *Apr. 2, 2024

(54) COIL FOR MOBILE DEVICE CONTEXT-DRIVEN SWITCHING AND WIRELESS CHARGING

(71) Applicant: INTEL CORPORATION, Santa Clara, CA (US)

(72) Inventors: Anand S. Konanur, Sunnyvale, CA (US); Songnan Yang, San Jose, CA (US); Ulun Karacaoglu, San Diego, CA (US); Jiancheng Tao, Shanghai (CN); Farid Adrangi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 356 days.

This patent is subject to a terminal disclaimer.

(21) Appl. No.: 16/385,088

(22) Filed: Apr. 16, 2019

(65) Prior Publication Data

US 2019/0288542 A1 Sep. 19, 2019

Related U.S. Application Data

(63) Continuation of application No. 14/911,244, filed as application No. PCT/US2013/075594 on Dec. 17, 2013, now Pat. No. 10,263,451.

(Continued)

(51) Int. Cl.
*H02J 7/00* (2006.01)
*G06F 1/16* (2006.01)
(Continued)

(52) U.S. Cl.
CPC ............... *H01Q 7/00* (2013.01); *G06F 1/162* (2013.01); *G06F 1/1635* (2013.01);
(Continued)

(58) Field of Classification Search
CPC .... H02J 7/025; H02J 17/00; H02J 2007/0096; H02J 50/10; H02J 7/02; H02J 7/0025;
(Continued)

(56) References Cited

U.S. PATENT DOCUMENTS 10,135,294 B1 * 11/2018 Leabman ................. H02J 50/80
11,600,923 B2 * 3/2023 Konanur ............... G06F 1/1698
(Continued)

FOREIGN PATENT DOCUMENTS

KR 20150072138 * 10/2013
KR 20140011756 A 1/2014

*Primary Examiner* — Alexis B Pacheco
(74) *Attorney, Agent, or Firm* — KDW Firm PLLC

(57) ABSTRACT

Apparatus, system and method to provide switchable coils in a computing device, comprising: a plurality of electrically conductive coils to transfer electromagnetic energy; a sensor coupled to a processor, to select a coil from among the plurality of electrically conductive coils; a switch to energize the selected coil; and a switch controller coupled to the switch and to the processor. In some embodiments, the plurality of coils may comprise an inductive charging interface. Some embodiments may further include a communication interface between the processor to the plurality of electrically conductive coils, the plurality of coils comprising an interface for near-field communications (NFC). The antenna coils may be arranged to provide improved NFC coverage when the computing device is in a respective predetermined physical configuration. Sensors may be used to detect the configuration and switch NFC communications to use a preferred antenna coil for the detected configuration.

28 Claims, 15 Drawing Sheets

Related U.S. Application Data

(60) Provisional application No. 61/864,433, filed on Aug. 9, 2013, provisional application No. 61/864,430, filed on Aug. 9, 2013.

(51) Int. Cl.

| | | |
|---|---|---|
| *G06F 3/039* | (2013.01) | |
| *G06F 3/041* | (2006.01) | |
| *G06F 3/044* | (2006.01) | |
| *H01Q 1/22* | (2006.01) | |
| *H01Q 3/24* | (2006.01) | |
| *H01Q 7/00* | (2006.01) | |
| *H02J 7/14* | (2006.01) | |
| *H02J 50/10* | (2016.01) | |
| *H02J 50/40* | (2016.01) | |
| *H02J 50/80* | (2016.01) | |
| *H04B 5/00* | (2006.01) | |
| *H04W 4/80* | (2018.01) | |

(52) U.S. Cl.
CPC .......... *G06F 1/1643* (2013.01); *G06F 1/1698* (2013.01); *G06F 3/0393* (2019.05); *G06F 3/04162* (2019.05); *G06F 3/044* (2013.01); *H01Q 1/2266* (2013.01); *H01Q 3/24* (2013.01); *H02J 7/00034* (2020.01); *H02J 50/10* (2016.02); *H02J 50/402* (2020.01); *H02J 50/80* (2016.02); *H04B 5/0031* (2013.01); *H04B 5/0037* (2013.01); *H04B 5/0081* (2013.01); *H04W 4/80* (2018.02); *H04B 5/0087* (2013.01)

(58) Field of Classification Search
CPC ......... H02J 50/40; H04W 4/008; H04W 4/80; G06F 3/00; G06F 3/041; G06F 3/0416; G06F 3/044; G06F 1/16; G06F 1/162; G06F 1/1635; G06F 1/1643; G06F 1/1698; H04B 5/0081; H04B 5/0037; H04B 5/0031; H04B 5/0087; H04B 5/00; H01Q 1/2266; H01Q 3/24; H01Q 7/00; H01Q 1/22
USPC .......................................................... 320/108
See application file for complete search history.

(56) References Cited

U.S. PATENT DOCUMENTS

| | | | |
|---|---|---|---|
| 2007/0008140 A1* | 1/2007 | Saarisalo | G06K 7/0008 340/572.7 |
| 2007/0182367 A1* | 8/2007 | Partovi | H02J 50/80 320/108 |
| 2010/0270970 A1* | 10/2010 | Toya | H02J 50/80 320/108 |
| 2011/0136550 A1* | 6/2011 | Maugars | H02J 50/10 455/573 |
| 2012/0235633 A1* | 9/2012 | Kesler | H02J 50/80 320/108 |
| 2012/0309303 A1* | 12/2012 | Hillan | H04B 5/0031 455/41.1 |
| 2013/0043734 A1* | 2/2013 | Stone | H02J 50/40 307/104 |
| 2013/0052950 A1* | 2/2013 | Hillan | H04L 69/28 455/41.1 |
| 2013/0119773 A1* | 5/2013 | Davis | H02J 50/90 307/104 |
| 2013/0119926 A1* | 5/2013 | Lin | H02J 50/90 320/108 |
| 2013/0309965 A1* | 11/2013 | Hillan | H04M 1/72412 455/41.1 |
| 2016/0031332 A1* | 2/2016 | Garcia Briz | H02J 50/402 320/108 |
| 2016/0087476 A1* | 3/2016 | Carobolante | H04B 5/0037 320/108 |
| 2020/0295606 A1* | 9/2020 | Park | H01F 38/14 |
| 2021/0218279 A1* | 7/2021 | Sun | H02J 50/402 |

* cited by examiner

100

100

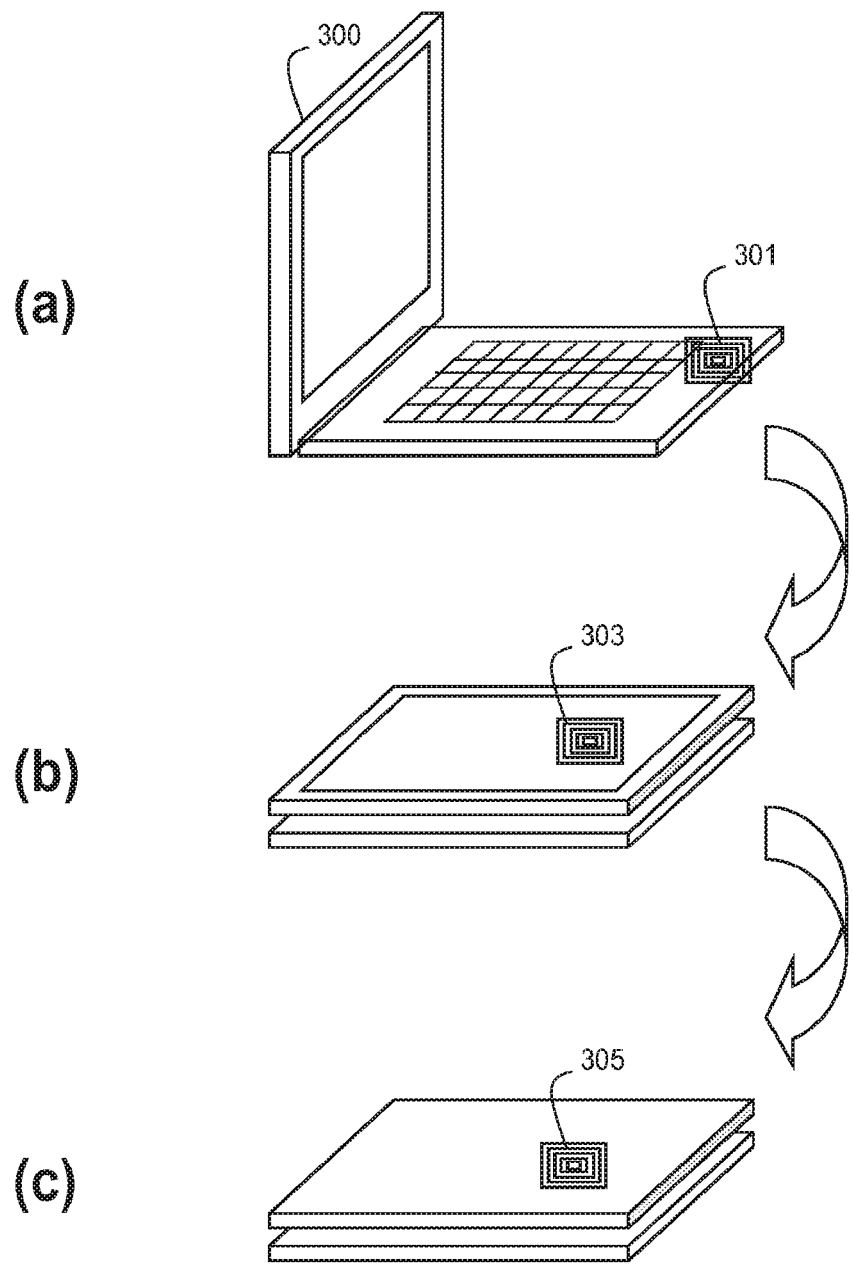

FIG. 7
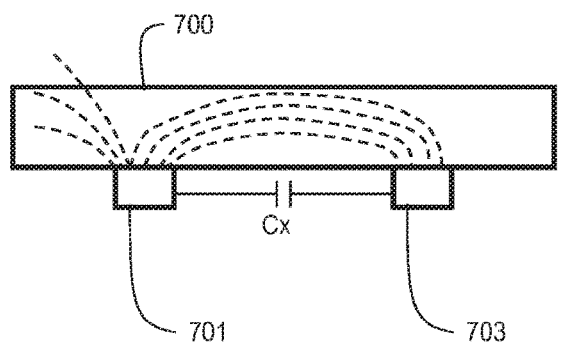
(a)
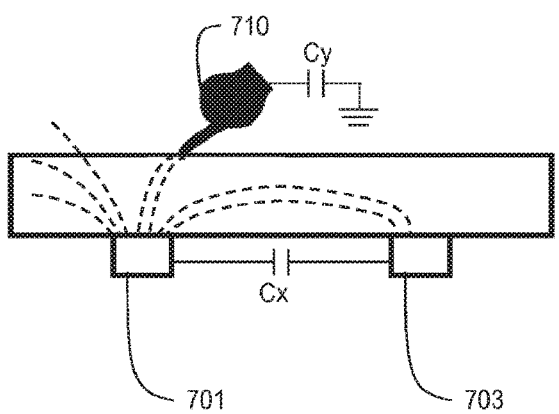
(b)
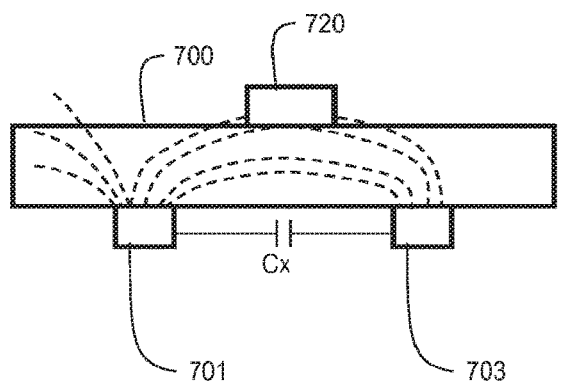
(c)

FIG. 8
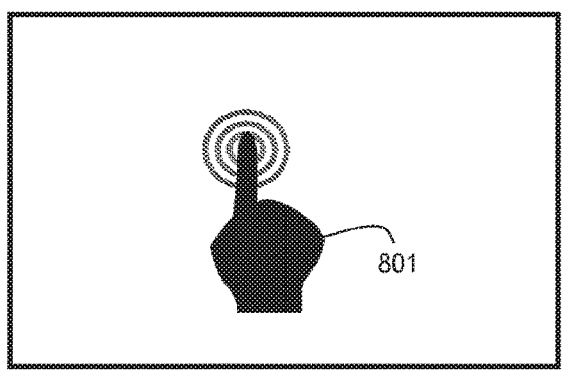
(a)
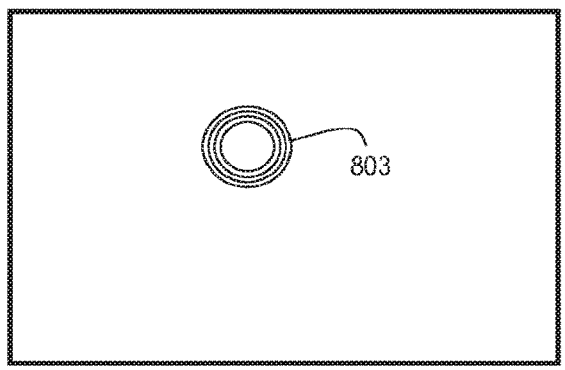
(b)
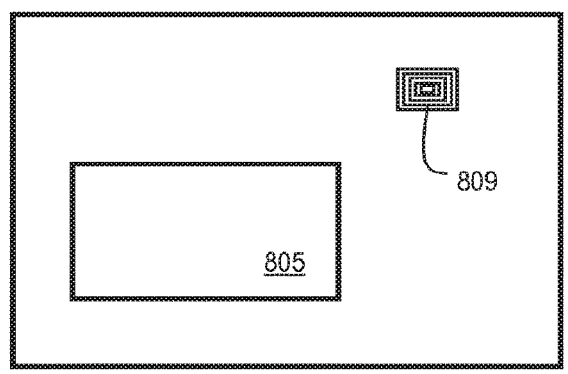
(c)
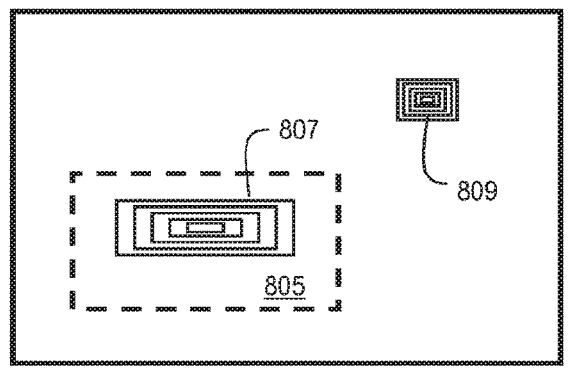
(d)

900

950

1100

1200

1300

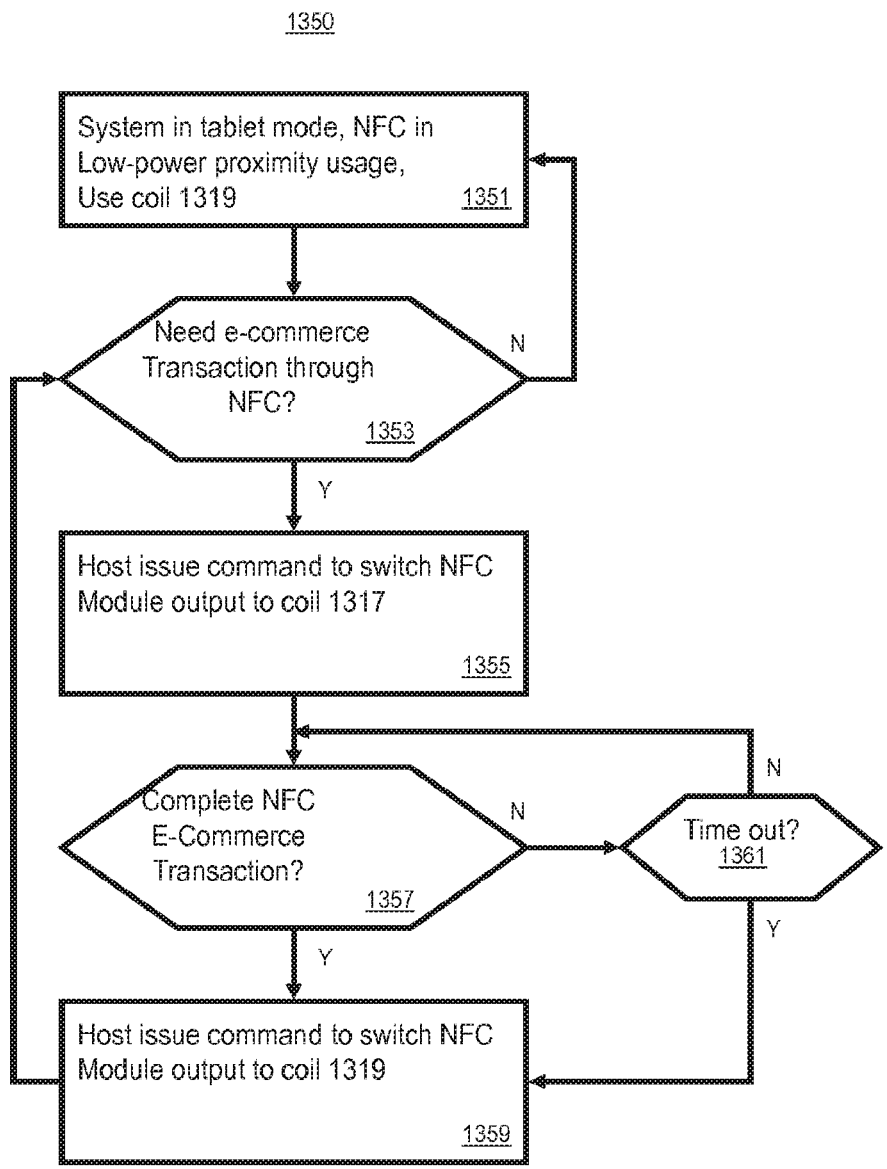

1401

COIL FOR MOBILE DEVICE CONTEXT-DRIVEN SWITCHING AND WIRELESS CHARGING

CROSS-REFERENCE TO RELATED APPLICATIONS

This application is a continuation of U.S. application Ser. No. 14/911,244, filed on Feb. 9, 2016, which is a National Stage Entry of PCT Application Ser. No. PCT/US2013/075594 filed on Dec. 17, 2013, which claims the benefit of U.S. Provisional Patent Application Ser. No. 61/864,430, filed on Aug. 9, 2013, and the benefit of U.S. Provisional Patent Application Ser. No. 61/864,433, filed on Aug. 9, 2013, the entire content of both of which are hereby incorporated by reference in their entirety.

TECHNICAL FIELD

Embodiments are generally related to inductive energy transfer, e.g., by portable devices for communication or for recharging.

BACKGROUND

Devices within close proximity may wirelessly transfer energy for various reasons. For instance, a device may wirelessly charge another device's battery. Also, two devices may engage in near field communications ("NFC").

NFC and wireless charging are emerging technologies that are integrated into mobile platforms such as tablets, smartphones, notebooks and other small computing devices (e.g., Ultrabook™ device—Ultrabook is a trademark of Intel Corporation in the U.S. and/or other countries). Both are forms of wireless energy transfer, one for the purpose of communications, and the other for the purpose of charging a rechargeable energy store such as a battery. Such wireless energy transfer may involve an electromagnetic coupling between proximate coils that may act as antennas. For example, a first device may have a transmitting coil and a second device may have a receiving coil. The coils are made of an electrically-conductive material. An electrical current flowing through the transmitting coil generates a magnetic field. In turn, the magnetic field may induce an electrical current in the receiving coil. The electrical current may be modulated, producing a modulated magnetic signal and thus transmitting information.

NFC is an emerging technology and desirable feature that is integrated into mobile platforms such as small computing devices, (e.g., clamshell, slider and convertible configured systems), tablets, smartphones and handhelds. They are expected to lead to new touch based communication usages. These usages can be broadly classified into: a) Device owner tapping two of her own devices together, e.g. to pay on a personal point-of-sale (POS) with a handheld or credit card; and b) peer to peer (P2P) tap, where two people each with their own device tap to enable pairing, transfer etc.

As touch screens and/or sensors take increasingly more real estate on a mobile device, NFC and/or wireless charging coils have been placed under touch sensor/touch screens. However due to the blockage of touch sensor and system power constraints, the user experience of reading a NFC-enabled device (e.g., a credit card) through the touch sensor/screen is not sufficiently satisfying. It is especially unsatisfying when cards or tags of different form factors (i.e., shapes) are presented at various orientations to the NFC coil underneath the touch sensor/screen.

The performance and effectiveness of NFC and wireless charging is very sensitive to size, relative location and orientation of the two coils involved. For instance, when a misalignment exists between transmitting and receiving coils, a smaller electrical current is induced in the receiving coil. As a result, a reduced energy transfer occurs. This may unfortunately reduce the efficacy of wireless charging and NFC applications.

Some conventional solutions to improving NFC performance involve adding an external amplifier between the NFC modules and coil to boost the signal. However, doing so consumes more power and sometimes causes co-existence problems with the touch sensor/screen. Other conventional solutions for both NFC and wireless charging involve providing switchable coils to create larger charging or card reading area. However, switching between multiple coils alone will cause a slow response to the user and thus produce an unsatisfying user experience.

Because NFC-enabled devices may be reconfigured during use into a variety of lid modes, a single NFC antenna is unable to provide adequate coverage for all modes. Therefore, there exists a need to provide improved NFC performance for an NFC-enabled device that may be reconfigured into more than one physical configuration.

BRIEF DESCRIPTION OF THE DRAWINGS

FIG. 3 illustrates a deficiency of one NFC coil servicing a plurality of physical configurations.

FIG. 7 illustrates capacitive changes when a finger touches a touchscreen.

FIG. 8 illustrates operation of a touchscreen in accordance with an embodiment of the present disclosure.

FIGS. 13A-13B illustrates a block diagram and flow chart of implementation of sensor based NFC coil switching in tablet mode.

DETAILED DESCRIPTION

Figure 1A:
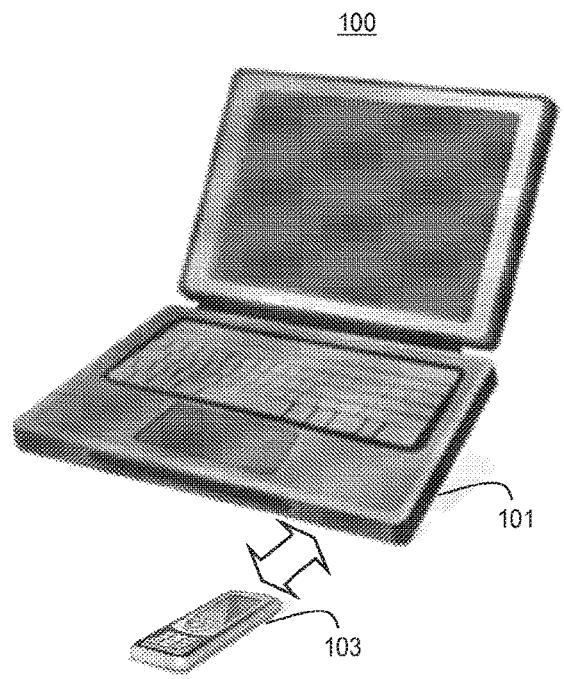
FIGS. 1A-1B illustrate exemplary tapping surface placements depending upon usage.

Apparatus, system and method to support wireless inductive power charging using a touch-sensitive screen, pad, or the like are described. Apparatus, system and method to support wireless NFC communication using a touch-sensitive screen, pad, or the like are described. Other embodiments are described and claimed.

Exemplary embodiments of the present disclosure are directed to providing a plurality of NFC coils for an NFC-enabled device, such that a specific NFC coil is selected and utilized depending upon a physical configuration of the NFC-enabled device.

Exemplary embodiments of the present disclosure are further directed to using a profile detection capability of modern capacitive touch sensors (e.g., a touch screen) on a mobile device in order to detect the size and shape of a metallic coil inside an NFC-enabled device, or that of wireless charging enabled devices, when such NFC-enabled devices or wireless charging enabled devices are placed next to the touch sensor. Based on the information detected by the touch sensor, a system controller may then select one of a plurality of transmitter coils embedded under the touch sensor (for NFC or wireless charging) in order to provide improved performance Touchscreens may be incorporated into a wide range of devices, such as (and without limitation) an ultra-mobile device, a mobile device, a fixed device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, consumer electronics, programmable consumer electronics, game devices, television, digital television, set top box, and so forth.

Various embodiments are generally directed to advanced near-field wireless communications systems. Some embodiments are particularly directed to wireless networks implementing one or more Wi-Fi Alliance (WFA) standards. In some embodiments, for example, a wireless network may operate according to the WFA Wi-Fi Direct standard, 2010 Release. In various embodiments, such a Wi-Fi Direct network may also operate using interfaces, protocols, and/or standards developed by the WFA Wi-Fi Direct Services (WFDS) Task Group. The embodiments, however, are not limited to these examples.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices. Various embodiments also relate to apparatus or systems for performing these operations.

This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

NFC usage may be broadly classified into: a) Device Owner tapping two of her own devices together, e.g. to Pay on a personal POS with a handheld or credit card; and b) Peer to Peer tap, where two people each with their own device tap to enable pairing, transfer etc. When viewed from a customer ease of experience perspective, these two broad categories of usages require entirely different tapping surfaces. A "self-tap" usage, in which a user typically holds and manipulates an NFC-enabled device next to an NFC-enabled reader, ordinarily includes usage of a tapping surface with visual feedback and ease of access from a display side facing the user. A "peer-to-peer tap" usage (hereinafter "P2P"), in which a user of a first NFC-enabled device ordinarily positions the first device near to a second NFC-enabled device. In the peer-to-peer tap usage, a tapping surface may be positioned away from the display side (e.g., on bottom of the device) in order to favor communication in that direction, because users engaging in a peer-to-peer tap, and holding their devices in a typical orientation for such usage, ordinarily will be facing each other from opposite directions.

Exemplary embodiments of the present disclosure are directed to a system and method to detect, by a system controller coupled to a touch sensor/screen, geometry information related to the size and shape of a metallic coil inside an NFC-enabled device, or that of wireless charging enabled devices, when such NFC-enabled devices or wireless charging enabled devices are placed next to the touch sensor/screen. Based on the detected geometry information, one of a plurality of transmitter coils embedded under the touch sensor/screen (for NFC or wireless charging), is selected in order to provide improved performance With the geometry information of the receiver coil, the transmitter device can make much better decision on which is the best coil to use to deliver best user experience ("UX").

In contrast to simply adding more amplifiers, embodiments will avoid the additional power the amplifier may consume while provide better and more uniform NFC coverage.

In contrast to blindly switching in a fixed pattern between multiple coils behind the touch sensor/screen, embodiments are able to quickly identify a coil to use based on the sensor profile detection inputs, and provide a fast response to a user. Even if a switchable coil method uses either feedback from device under charge or load impedance change to determine which coil is best, the method does not provide enough information such as multiple devices being charged by one device or size mismatch between NFC reader coil and tag coil.

Reference is now made to the drawings. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

Figure 1B:
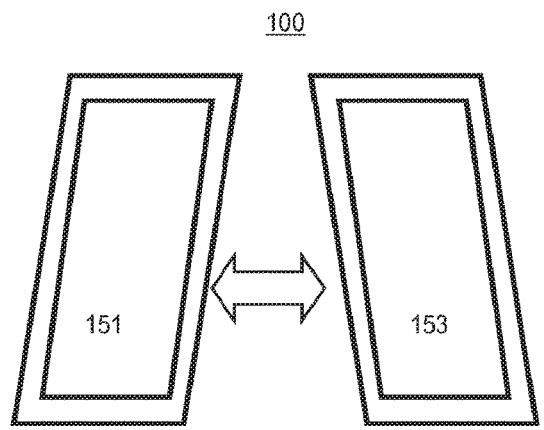

FIGS. 1A-1B illustrate the difference between self-tap and peer-to-peer tap. FIG. 1A illustrates a self-tap usage between a computing device 101 (e.g., an NFC-enabled clamshell laptop as illustrated) and a device 103 (e.g., an NFC-enabled handheld device as illustrated). Computing device 101 and device 103 are ordinarily controlled by a single user. The self-tap usage is not limited to the illustrated types of devices, and may include other types of devices. For example, device 103 may include a credit card with an embedded NFC coil. FIG. 1B illustrates a peer-to-peer tap between two computing devices 151, 153 controlled by respective users as supported by an operating system such as Windows™ 8. In the configuration of FIG. 1B, a single surface antenna placement is sufficient.

The differing requirements for self-tap and peer-to-peer tap is reflected in the different placement requirements put forth by credit card service providers and laptop operating system vendors, both of which have to be met by PC OEMs and NFC module suppliers. While it is possible to meet either one of the usage requirements above, there are no known scalable solutions to provide with high assurance the independent placement of two NFC tapping surfaces driven by the same module while optimally and selectably supporting both self-tap and peer-to-peer tap. Present approaches rely on the use of two independent modules to drive separate NFC coils, one coil on each surface of interest. This leads to a doubling of cost for the modules.

Figure 2A:
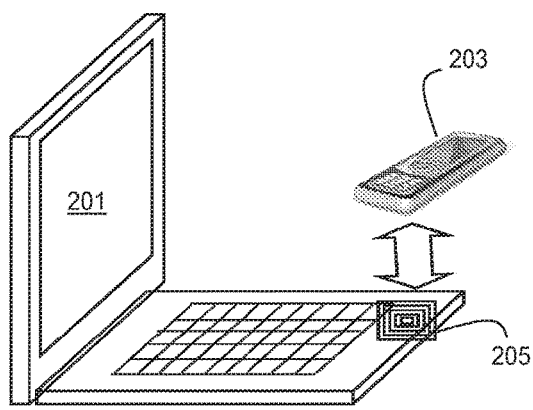
FIGS. 2A-2B illustrate exemplary tapping surface placements depending upon physical configuration.
Figure 2B:
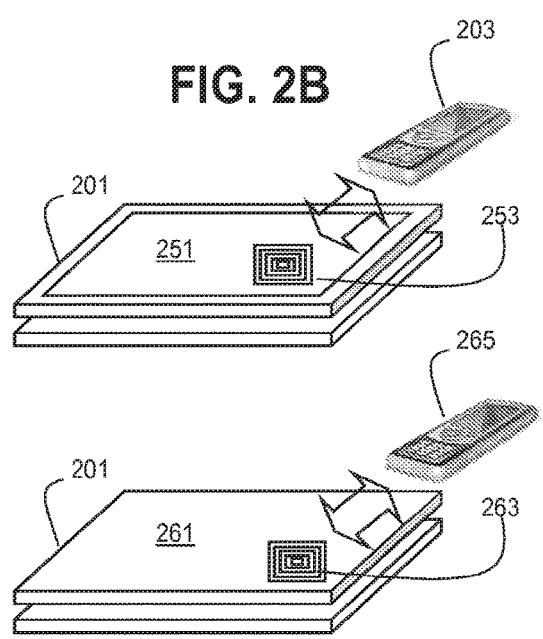

Convertible devices that can be operated in different lid modes (e.g., clamshell, tablet, and/or closed lid) are increasing popular. However, such convertible devices add additional complexity in the location of the NFC coil so that it is accessible in all lid modes. FIGS. 2A-2B illustrate usage of NFC with a convertible device in various configurations.

When a single slider/convertible device need to support both self tap and P2P tap, there is a need for dual surface coverage. In convertible form factor devices, certain screen positions can block primary NFC tapping area, requiring a secondary tapping area to be provided. In the figure above, a tapping surface is required next to the palm rest or in the track pad for "clamshell mode" and another tapping surface is required on the bottom of the device for use in "tablet mode" when the palm rest area is blocked.

Specifically, FIG. 2A illustrates transfer via NFC communication between a conventional laptop 201 in an open position and a device 203 enabled for NFC and/or wireless charging, such as a smartphone. A tapping surface 205 of the laptop 201 is unblocked when laptop 201 is in an open position, but will be blocked when laptop 201 is in a closed position. FIG. 2B illustrate a top surface 251 of device 201 in a tablet configuration, device 201 having a first tapping surface 253 that is conveniently accessible to a user of tablet 201. FIG. 2B further illustrates a bottom surface 261, and a second tapping surface 263 that is conveniently accessible to support a separate NFC-enabled device 265 that may be operated by a different user.

FIG. 3 illustrates a convertible device 300 in which no single location of a tapping device provides adequate NFC coverage and/or wireless charging. Placing coil 301 on the palm rest or touchpad (configuration (a)) is convenient for all modes unless closed or in tablet mode. When device 300 is configured as a tablet (configuration (b)), then coil 303 is more conveniently placed. When device 300 is otherwise closed (configuration (c)) and the display or cover shields the palm rest area, then coil 305 is more conveniently placed. Additionally, for small tablets it may be important to provide a tapping surface on the back cover in order to support P2P taps between individuals.

Embodiments of the present disclosure address the above shortcomings through the use of context based switching between two or more separate coils, driven one at a time by a single NFC module. The coils may be referred to herein as NFC coils, but it will be understood that such NFC coils may also be able to support wireless charging unless the context of usage clearly indicates that wireless charging is not supported. The NFC module is further able to support wireless charging.

Figure 4A:
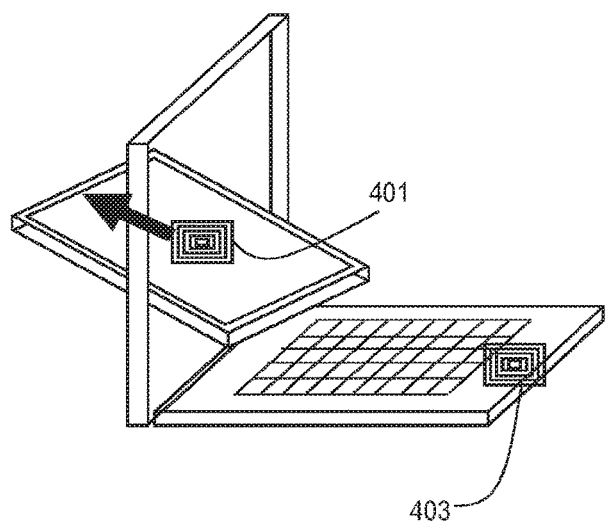
FIGS. 4A-4D illustrate a convertible system with multiple coils for each of a respective physical configuration.
Figure 4B:
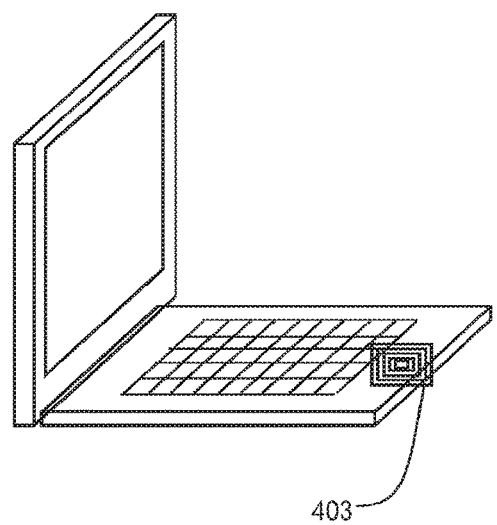
Figure 4C:
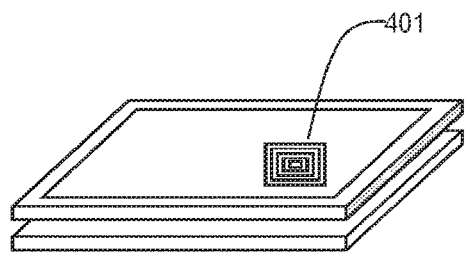
Figure 4D:
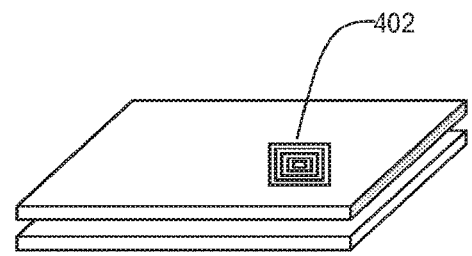

Embodiments of the present disclosure address a problem of coil placement for multi-mode devices by using a context base switch between multiple coils, the coils all being driven by a single NFC module. For example, FIGS. 4A-4D illustrates a laptop device having three different coils with placements optimized for clam shell, tablet modes, for both "me to me" and "me to you" applications. One of the coils may be selected and "switched to" based on the context of the system configuration and usage. FIG. 4A illustrates coil 401 located under a bezel surrounding the display screen. Coil 402 may be located on the back of the laptop device and may be adapted for NFC "me to you" type applications. Coil 403 may be located at an accessible location when the laptop device is open, such as a palm-rest area. In some embodiments, coil 403 may be coupled to the laptop device back cover or the cover bottom of the back cover, but is adapted for all NFC applications. FIGS. 4B-4D further illustrate coils 401, 402 and 403 with the multi-mode device in various position modes. Coils 401-403 may also be referred to herein as antennas 1-3, respectively. In general, such embodiments position a plurality of coils on at least two different major surfaces of multi-mode devices. At least some major surfaces of multi-mode devices may contain no coils, one coil, or more than one coil.

FIGS. 2A-2B and 4A-4D illustrate coils coupled to a major surface of a convertible device, thus providing approximately hemispherical coverage. However, embodiments are not limited to coupling coils to a major surface. In some embodiments, coils may be coupled to a minor surface such as an edge or corner, this providing greater than hemispherical coverage.

Data used to select a preferred coil for NFC communication and/or wireless charging includes determination of a context for each coil. Context may be determined at least in part by using physical sensors. While a variety of sensors may be used for switching between the two or more coils, the sensors used by some embodiments may include one or more of: an accelerometer; a Hall Effect sensor; a pressure sensor; and/or a gyroscope. The sensors may be used to determine one or more of: a state of the lid angle; open/closed sensor; latched/unlatched sensor; device orientation; placement of the device on a surface; and so forth. An operating system may receive a message when there is a significant change in one or more of the sensor inputs, sufficient to indicate a meaningful change in physical status or physical state of laptop device, e.g., between a closed lid and clamshell mode or between clamshell and tablet modes. A change in physical state that may not be meaningful may be a physical change that does not result in a significant change in usage of the coils or the convertible device, e.g., a slight change in lid angle for the purpose of lessening reflection glare.

Figure 5:
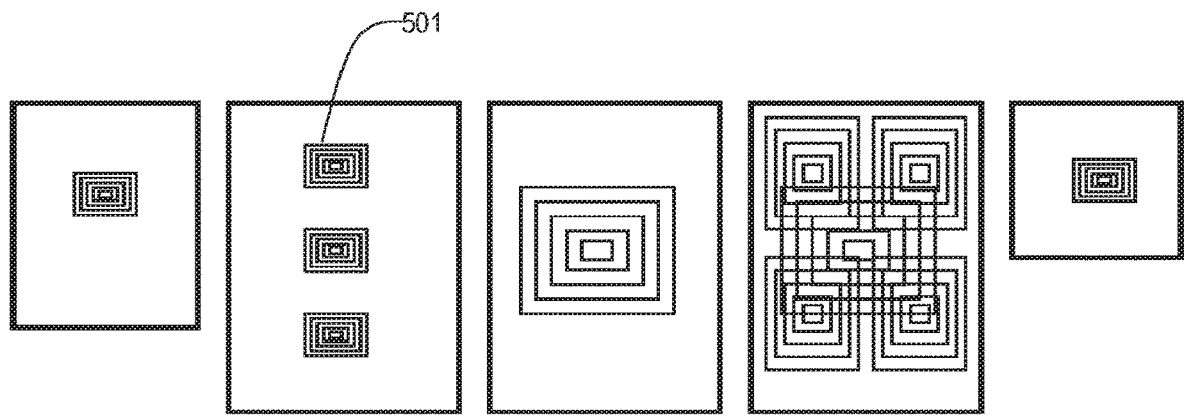
FIG. 5 illustrates exemplary form factors of cards designed for inductive coupling.

FIG. 5 illustrates various form factors (i.e., sizes and shapes) of available NFC tags/cards or devices capable of wireless charging. A credit-card size device may be about 2"×3", and a smartphone size device may be about 4"×6". Even for cards having the same form factor, a coil embedded in the card may be different (e.g., different location, shape, number of turns, thickness, etc.). These variations causes significantly challenge to NFC reader integration into mobile devices and/or small computing devices such as notebooks, smartphones, and tablets. On one hand, there is no one geometry of reader coil that provide an optimum magnetic coupling with all different sizes and shapes of receiver coil in cards/tags, especially when taking into account the different orientation and location that the tags could be presented to the embedded reader. A single large reader coil that covers substantially the entire screen would have drawbacks that include poor coupling to a small receiver coil if the receiver coil is placed near the center of the reader coil. Another drawback is that coils couple more efficiently to other coils of similar size, and receiver coils are limited to the size of the card or tag. On the other hand, a system power limit for a mobile device does not usually allow an additional amplifier to be added to boost the signal. Multiple reader coils may be used to couple with cards with different geometry, however it is difficult to determine which one of the multitude of reader coils should be selected.

Figure 6:
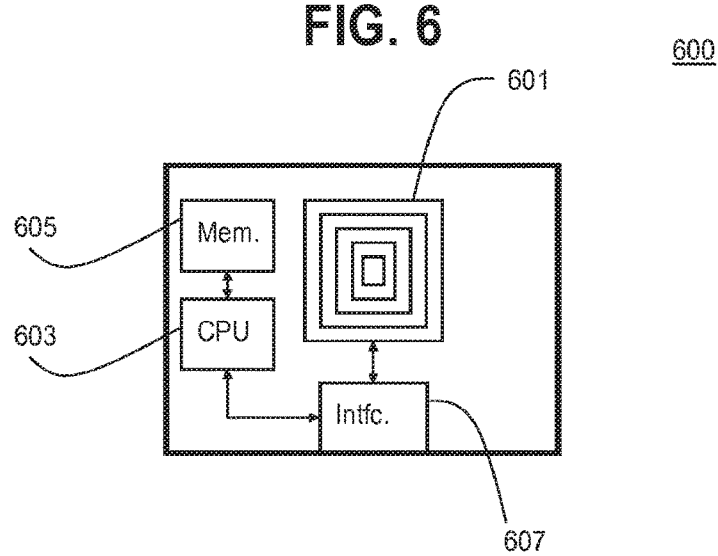
FIGS. 6 illustrates a schematic view of a touch screen in accordance with an embodiment of the present disclosure.

FIG. 6 illustrates at a high level of abstraction a schematic view of a device 600 capable of NFC communications and/or wireless charging. Device 600 may include a processor 603 coupled to a memory 605. CPU 603 is further coupled to an interface circuit 607, which interfaces with coil 601. Additional coils (not shown) also interface with CPU 603. For example, device 600 may be incorporated into a touch-sensitive screen display, touch pad, or the like. Such designs, with coils under a touch-sensitive area, may allow devices to use a profile sensing capability of a touch sensor, to which the coil is coupled, to provide more useful information regarding the tag/card that the system is trying to read, in order to improve the NFC reader performance FIG. 7A is a cross-sectional view of a capacitive touch sensor/screen 700 that illustrates a principle of operation of the touch sensor. Embodiments of sensors/screens uses a capacitive touch sensor array to detect mutual capacitance variation introduced by high dielectric constant material (e.g., a finger) or conductive objects (e.g., a stylus or other metal object) in proximity to the sensor array. The capacitance variation is interpreted as a "touch" event.

Touch sensor 700 includes a driver terminal 701 and a receiver terminal 703. Terminals 701, 703 connect touch sensor 700 to an external circuit (not illustrated). Terminals 701, 703 furthermore are electromagnetically coupled to each other, as indicated by field lines running through the body of screen 700. An equivalent capacitance Cx is formed between terminals 701, 703. In a quiescent state, once Cx is charged, little or no current flows through terminals 701 or 703.

As shown in FIG. 7B, when a finger 710 comes in between the touch sensor's driver and receiver terminals 701, 703, the presence of finger 710 diverts part of the electric field. Finger 710 causes a parasitic capacitance Cy. The change in the electric field produces a variation in the mutual capacitance and/or current drawn by terminal 701, which may be interpreted by touch sensor 700 as a touch event.

Similarly, FIG. 7C illustrates when a conductive object 720 comes close to the touch sensor array. Object 720 also creates a change in the electric field in sensor 700 and/or mutual capacitance that can be detected by the sensor.

FIG. 8 illustrates usage of an embodiment in accordance with this disclosure. As shown in FIG. 8A, the touch of a finger 801 is registered by the touch sensor as a dot 803 in FIG. 8B. In FIG. 8C, when a card 805 that is compatible with NFC and/or wireless charging is placed on top of the touch sensor, the sensor is able to detect the conductive coil traces 807 embedded in card 805. It is the coil 807 being detected rather than the profile or outline of card 805. Based on the response from the touch sensor, the geometry and location of coil 807 may be calculated by a process carried out by a processor or firmware, which perform instructions stored in a memory.

Figure 9A:
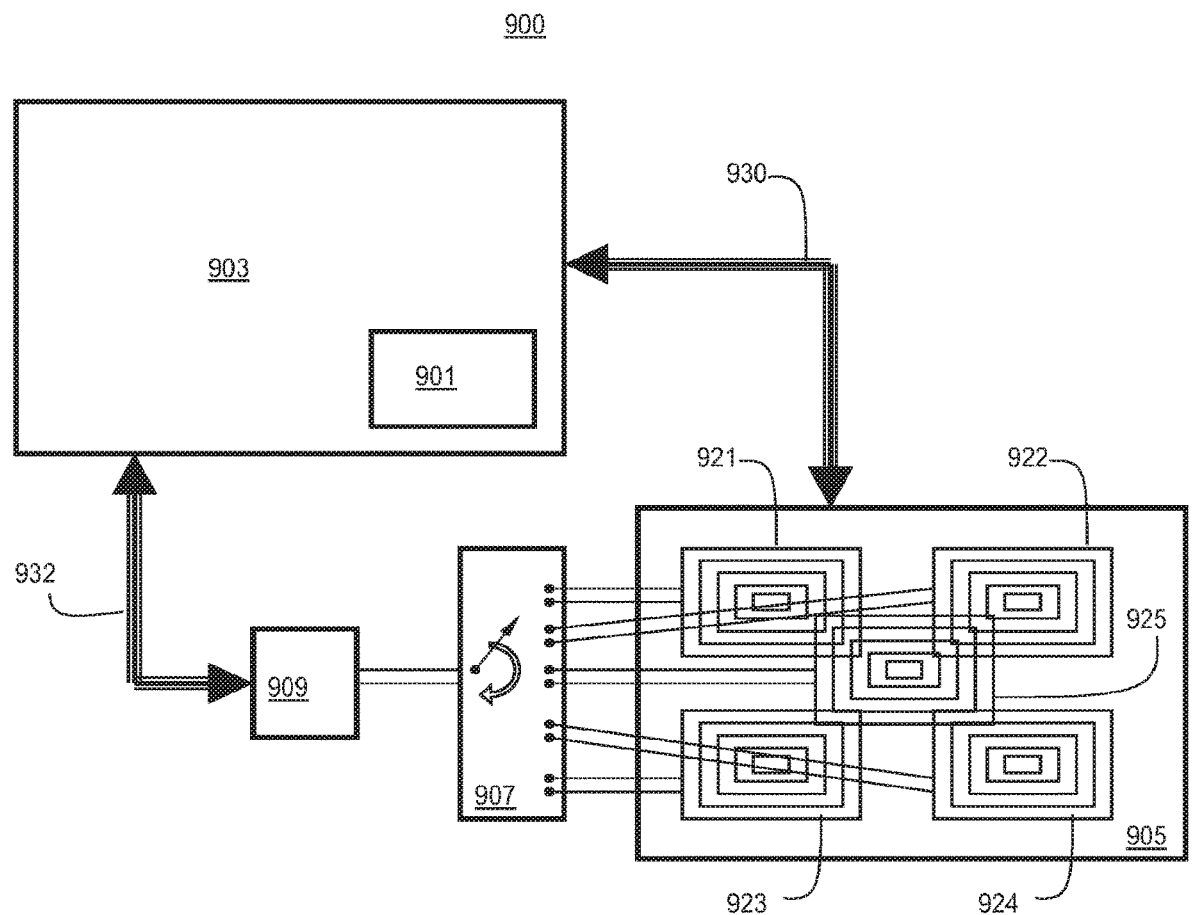
FIG. 9A illustrates a block diagram of a touchscreen in accordance with an embodiment of the present disclosure.

FIG. 9A illustrates a block diagram of an embodiment 900 that may be implemented in a laptop device. Embodiment 900 includes a host controller 901 and associated circuit board 903. Circuit board 903 includes support circuitry (e.g., circuit drivers, power distribution, memory, etc.) not illustrated but which will be known to persons of skill in the art. Circuit board 903 may be coupled via communication path 930 with touch panel 905. Touch panel 905 includes a plurality of coils, illustrated as coils 921, 922, 923, 924 and 925. The coils are placed in a predetermined pattern underneath or within touch panel 905. Some of coils 921, 922, 923, 924 and 925 may overlap in the plane of FIG. 9A, but will be separated along an axis perpendicular to the plane of FIG. 9A. Coils 921, 922, 923, 924 and 925 may be configured as receiving coils if reading information from an NFC-compatible card, or may be configured as transmitting coils if writing information to an NFC-compatible card or if being used for wireless charging.

If embodiment 900 is configured for NFC, then circuit board 903 and/or host controller 901 may be configured to transmit and receive communication signals, via communication path 930, for or from the NFC channel Circuit board 903 may be further coupled, via communication path 932, with NFC module 909. Path 932 supplies command signals and power energizing and detecting signals. NFC module 909 is communicatively coupled to a switch 907, and uses the command signals received from path 932 to control switch 907. Switch 907 selects one of the plurality of coils (e.g., one of coils 921, 922, 923, 924 and 925), allowing power energizing and detecting signals to be delivered to or read from the selected coil and associated circuitry.

Figure 9B:
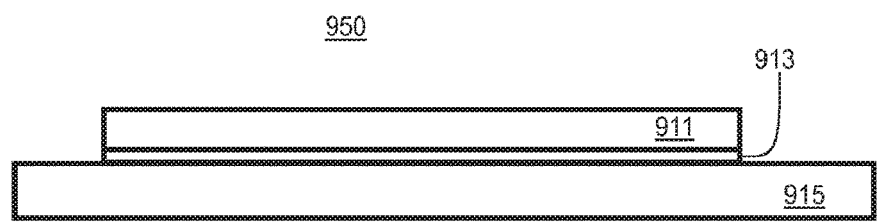
FIG. 9B illustrates a cross-sectional view of a touchscreen in accordance with the present disclosure.

FIG. 9B illustrates a cross-sectional view 950 of a portion of a laptop device incorporating an embodiments in accordance with the present disclosure. Cross-sectional view 950 illustrates touch screen 911, a plurality of NFC coils 913, and a battery 915 that powers the laptop device including touch screen 911 and NFC coils 913.

Knowledge of coil geometry and location may be used to determine a best available coil geometry, and switch to the best available coil underneath the touch screen 911, e.g., one of coils 921, 922, 923, 924 and 925. Determination of the best available coil geometry may include relationships such as measuring signal strengths, calculating ratios, comparison of responses from the plurality of coils, recognizing patterns from among such data, and so forth. Calibrations and pre-calculations involving such relationships may be performed on a one-time basis during device design to formulate a set of relationships (e.g., tabular or algorithmic) stored in system memory, which can be used to select a coil to energize based upon the status or values of the measured relationships. Calibrations and pre-calculations may proceed by, e.g., successively switching between each transmit coil (e.g., reader coil) for a predetermined NFC tag (e.g., receiver coil) placed at a preselected set of locations on touch screen 911.

During an NFC transaction, if the touch sensor detects an NFC coil from a card during its normal scanning routine (e.g., card 805 and coil 807), coils 921, 922, 923, 924 and 925 provide sufficient information (e.g., geometry and location information) to the host 901 to enable pattern recognition processing. Processing by the host 901 may include selecting which coil of the plurality of coils would provide the best magnetic coupling performance with the detected coil 807 in card 805 (e.g., by accessing a lookup table stored in memory), and commanding switch 907 to connect NFC module 909 with the selected reader coil to complete the NFC transaction.

Figure 10:
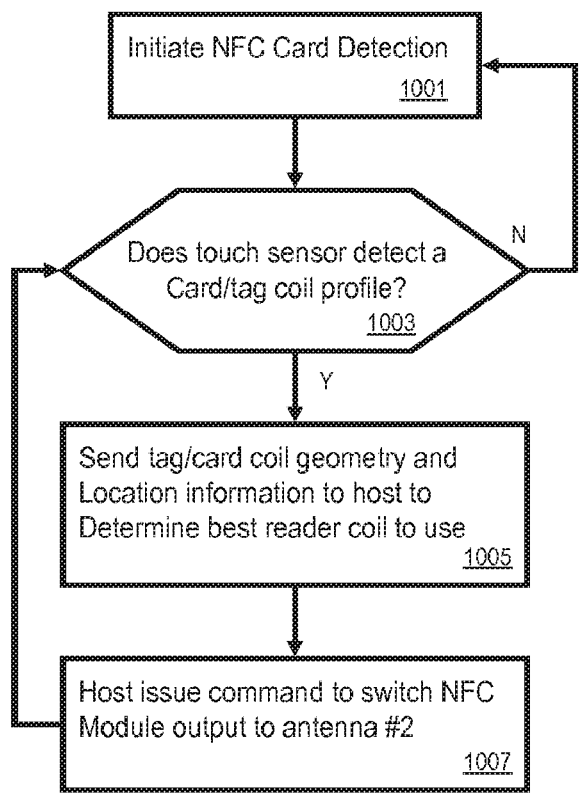
FIG. 10 illustrates a method of operating a touchscreen in accordance with an embodiment of the present disclosure.

FIG. 10 illustrates a flow chart in accordance with the present disclosure. At block 1001, NFC card detection is initiated. Next, at block 1003, a decision is made wither the touch sensor has detected a presence of a coil, e.g., a coil within a card or tag. If the outcome of block 1003 is negative, the process flow reverts to block 1001. If the outcome of block 1003 is positive, the process flow continues to block 1005.

At block 1005, information related to the tag and/or coil geometry and location information is sent to host 901 in order to determine the best reader coil to use, e.g., which of coils 921, 922, 923, 924 and 925 to read from.

Finally, at block 1007, a command is issued to switch 903 in the NFC module in order to switch to the coil selected at block 1005.

Although FIG. 10 illustrates a process related to NFC communication, a similar process may be used for wireless charging, in which touch sensor inputs can be used to determine a best transmit coil selection, and dynamically switching the transmit coil to achieve improved power transfer efficiency.

Figure 11A:
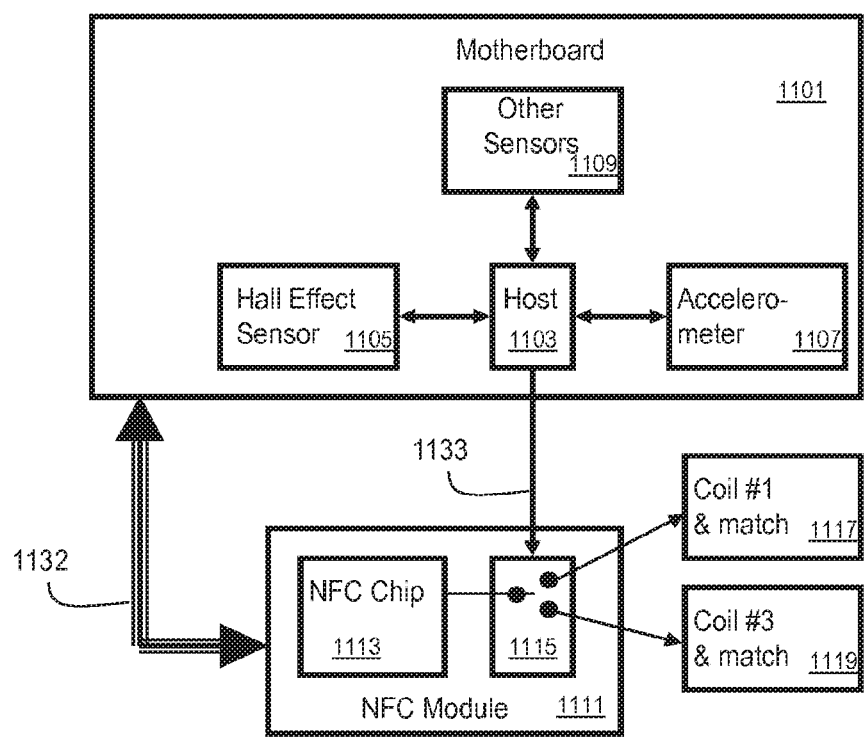
FIGS. 11A-11B illustrates a block diagram and flow chart of implementation of sensor based NFC coil switching.

FIG. 11A illustrates a system block diagram of an embodiment 1100 using sensor inputs to determine which coil to use in small computing devices (e.g., as shown in FIGS. 4B and 4C, between clam shell and tablet modes). Embodiment 1100 includes a circuit board 1101 (e.g., a motherboard) that includes a host processor 1103 that interfaces with sensors such as a hall effect sensor 1105, accelerometer 1107 and other sensors 1109 that may provide information about the usage, physical state or orientation of a device that incorporates embodiment 1100. Embodiment 1100 further includes a first coil 1117 and another coil 1119, including respective associated interface circuitry.

Circuit board 1101 is communicatively coupled via communication path 1132, with NFC module 1111. Path 1132 supplies command signals and power energizing and detecting signals. NFC module 1111 may include an NFC processor 1113 that is communicatively coupled to a switch 1115, and may use the command signals received from path 1132 to control switch 1115. Switch 1115 selects one of the plurality of coils and its interface circuitry (e.g., one of coils 1117 and 1119), allowing power energizing and detecting signals to be delivered to or read from the selected coil and associated circuitry. Switch 1115 may be further communicatively coupled to host processor 1103 via communication path 1133. Coils 1117 and 1119 may be selectively switched to support "me to me" usage (e.g., coil 401 and coil 403).

Communication path 1132 and/or 1133 may be used so that various input data from sensors 1105, 1107, 1109 may be processed by host processor 1103, and only the information pertaining to the state or change in state of NFC module 1111 is sent to NFC module 1111. An advantage is that future changes or updates to switching logic may be implemented without modifications to NFC module 1111. For example, if a particular switching feature becomes very successful, then future versions of NFC module 1111 maybe able to directly process the data from sensors 1105, 1107, 1109. Furthermore, embodiments are expandable via use of other sensors 1109 since NFC module 1111 is not aware of specific sensors and does not need to support all of them directly.

Figure 11B:
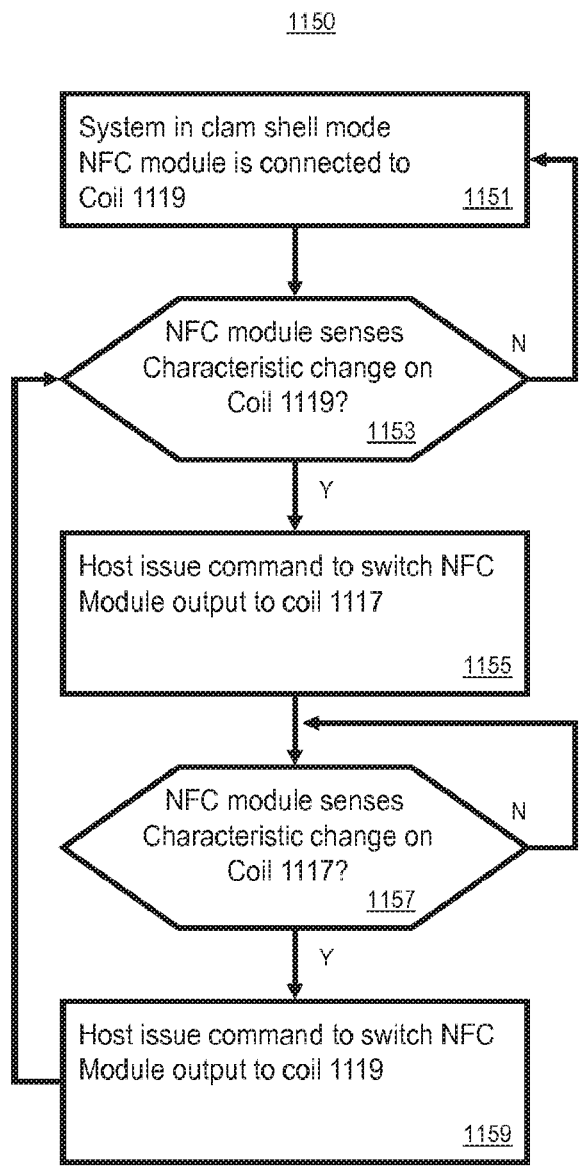

FIG. 11B illustrates a flow chart of process 1150 to select a coil, in accordance with an embodiment of the present disclosure. At block 1151, for a system in clam shell mode, the NFC initially may be connected to coil 1119.

Next, at block 1153, a decision is made whether sensor inputs indicate conversion to a different physical configuration, e.g., to tablet mode. If the result of block 1153 is negative, then control returns to block 1151. If the result of block 1153 is affirmative, then control passes to block 1155.

At block 1155, the host issues a command to switch the NFC module output to coil 1117. Control then passes to block 1157.

At block 1157, a decision is made whether sensor inputs indicate conversion to a different physical configuration, e.g., to clam shell mode. If the result of block 1157 is negative, then control returns to block 1157. If the result of block 1157 is affirmative, then control passes to block 1159.

Finally, at block 1159, the host issues a command to switch the NFC module to coil 1119. Control of the process then reverts to block 1153.

Figure 12A:
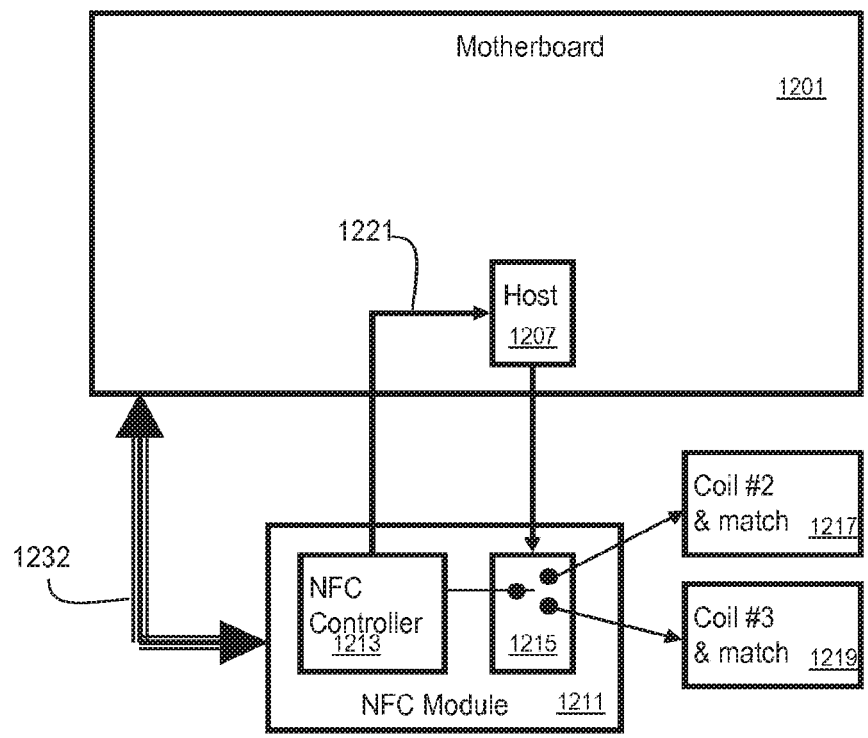
FIGS. 12A-12B illustrates a block diagram and flow chart of implementation of sensor based NFC coil switching.
Figure 12B:
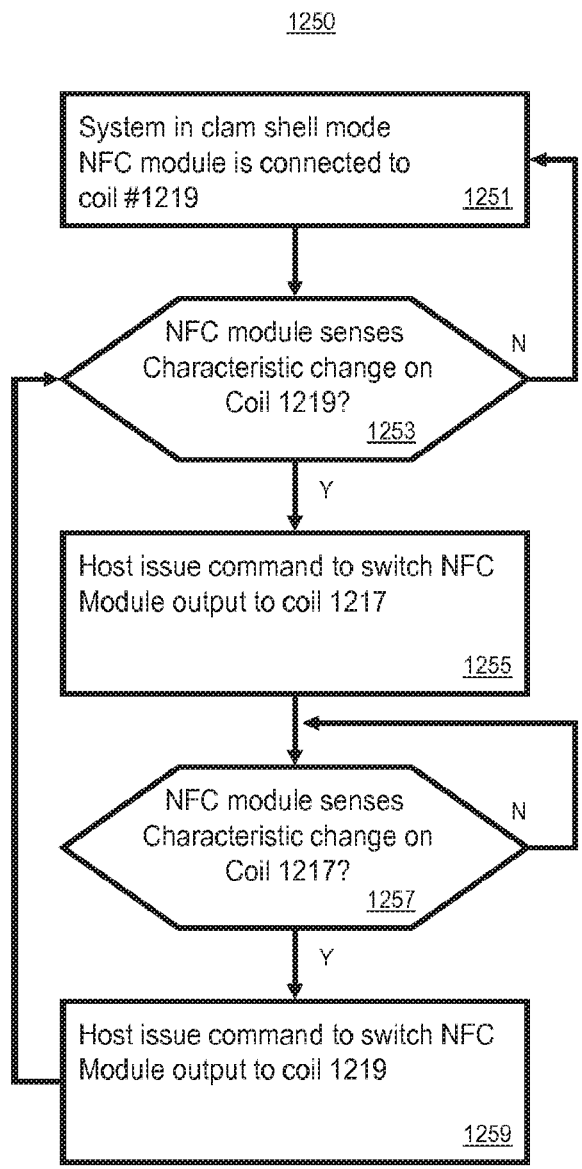

Embodiments may use additional sensors or triggers, either individually or together with the sensors described to this point. For example, embodiments may use a change in the received signal level at the NFC receiver to infer a physical change of the laptop device that may cause a different coil to be a preferred coil. NFC communications have a property such that the receiver is always on, even while the transmitter is operational. This provides a natural way to measure large changes in a received signal level when the lid mode changes. Signal level changes may be caused by drastic change in the matching between pairs of NFC coils, and hence power transfer efficiency between the NFC coil and an NFC controller. Refer to FIGS. 12A-12B.

FIG. 12A shows a system diagram of embodiment 1200 to sense environment change, for the purpose of determining which coil to use in a convertible small computing system (e.g., between clam shell and tablet modes of FIG. 4). Embodiment 1200 includes a host controller 1207, which may be mounted on a circuit board 1201 (e.g., a motherboard). Circuit board 1201 includes support circuitry (e.g., circuit drivers, power distribution, memory, etc.) not illustrated but which will be known to persons of skill in the art. Circuit board 1201 is communicatively coupled to NFC module 1211 via communication path 1232. Path 1232 supplies command signals and power energizing and detecting signals. NFC module 1211 may include a controller (such as NFC controller 1213) and switch 1215. NFC module 1211 controls switch 1215 in order to selectively connect host controller 1207 with either coil 1217 or coil 1219. Path 1221 communicatively couples NFC controller 1213 with host controller 1207. NFC module 1211 may be switched between coil 1217 and coil 1219 upon detection of which coil would provide the best coverage depending upon the current usage.

FIG. 12B illustrates a flow chart of embodiment of a process 1250 to sense environment change in order to determine which coil to use in a convertible small computing system (e.g., between clam shell and tablet modes as shown in FIG. 4). Process 1250 begins at block 1251 at which a convertible system initially may be in clam shell mode and NFC module 1211 may be connected to coil 1219.

Process 1250 may then transition to decision block 1253, at which NFC module 1211 senses whether there exists a characteristic or environmental change related to coil 1219. Some embodiments may involve whether coil 1219 has worsened in relation to coil 1217, e.g., whether performance using coil 1219 has deteriorated to be worse than performance using coil 1217, and/or whether performance using coil 1217 has improved to be better than performance using coil 1219. If no such characteristic or environmental change is sensed, then process 1250 may revert to block 1251. If a characteristic or environmental change is sensed, then control of process 1250 may proceed to block 1255.

At block 1255, if the response to decision block 1253 is affirmative, then host controller 1207 may issue a command to switch the output of NFC module 1211 to coil 1217. Control of process 1250 then transitions to decision block 1257.

At decision block 1257, NFC module 1211 senses whether there exists a characteristic or environmental change related to coil 1217. Some embodiments may involve whether coil 1217 has worsened in relation to coil 1219, e.g., whether performance using coil 1217 has deteriorated to be worse than performance using coil 1219, and/or whether performance using coil 1219 has improved to be better than performance using coil 1217. If no such characteristic or environmental change is sensed, then process 1250 may revert to block 1257. If a characteristic or environmental change is sensed, then control of process 1250 may proceed to block 1259.

At block 1259, if the response to decision block 1257 is affirmative, then host controller 1207 may issue a command to switch the output of NFC module 1211 to coil 1219. Control of process 1250 may then revert to decision block 1253.

Figure 13A:
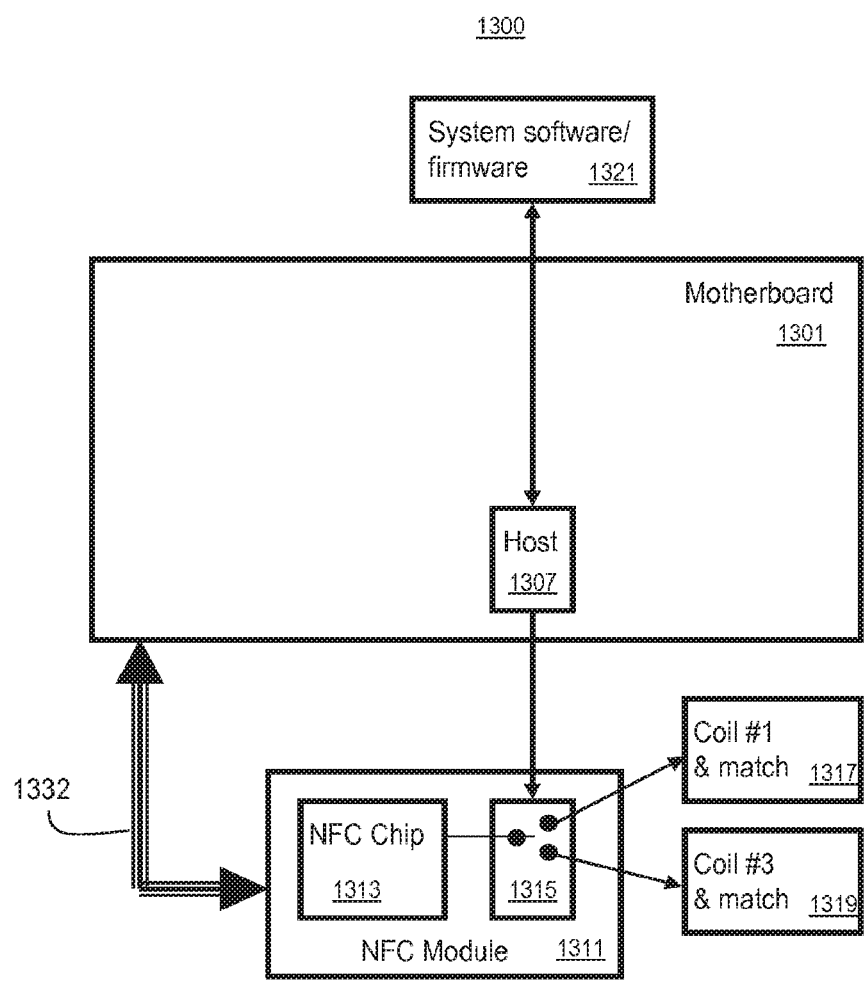

Embodiments may additionally use as triggers, either individually or together with other triggers described herein, the nature or purpose of an application accessing the NFC module. In some embodiments, the usage (as indicated by usage of an application program that is actively trying to control the NFC radio) determines the choice of coil to be used. For example, in a clamshell device when a payment application is active, a preferred coil to energize may be a coil mounted on or near the palm rest or touchpad. In contrast, if the active application were a P2P application, then a coil on the back of the display may be a preferred coil to energize. Activating a predetermined coil responsively to usage of an application program may be accomplished by a command from the application program or an operating system service that the application program uses. Alternatively, an operating system process (e.g., a background process) may monitor usage of the computing device by application programs, and activate a predetermined coil when a predetermined usage is detected. Refer to FIGS. 13A-13B.

FIG. 13A shows a system diagram of embodiment 1300 that is responsive to a nature or purpose of an application accessing the NFC module. Embodiment 1300 includes a host controller 1307, which may be mounted on a circuit board 1301 (e.g., a motherboard). Circuit board 1301 includes support circuitry (e.g., circuit drivers, power distribution, memory, etc.) not illustrated but which will be known to persons of skill in the art. Circuit board 1301 is communicatively coupled to NFC module 1311 via communication path 1332. Path 1332 supplies command signals and power energizing and detecting signals. NFC module 1311 may include a controller (such as NFC controller 1313) and switch 1315. NFC module 1311 controls switch 1315 in order to selectively connect host controller 1307 with either coil 1317 or coil 1319. Path 1321 communicatively couples NFC controller 1313 with host controller 1307. NFC module 1311 may be switched between coil 1317 and coil 1319 upon detection of the nature or purpose of an application accessing the NFC module.

Embodiment 1300 may include a software or firmware payment module 1321 to switch the output of NFC module 1311 between coil 1317 (e.g., tablet mode as shown in FIG. 4) and coil 1319 (e.g., open mode as shown in FIG. 4). NFC module 1311 may switch between coil 1317 and coil 1319 upon a system trigger to activate "tap-and-pay" mode to best support the current usage of the convertible computing device.

FIG. 13B illustrates a flow chart of one possible implementation using a payment software application module to configure a system to switch the output of NFC module 1311 between coils in tablet mode and open mode (as shown in FIG. 4). Process 1350 begins at block 1351 at which a convertible system initially may be in tablet mode and NFC module 1311 may be connected to coil 1319.

Process 1350 may then transition to decision block 1353, at which a query or notification is made whether an e-commerce transaction needs to be conducted using the NFC interface. If no made known, then process 1350 may revert to block 1351. If a need for an e-commerce transaction through the NFC interface is sensed, then control of process 1350 may proceed to block 1355.

At block 1355, if the response to decision block 1353 is affirmative, then host controller 1307 may issue a command to switch the output of NFC module 1311 to coil 1317. Control of process 1350 then transitions to decision block 1357.

At decision block 1357, a query may be made whether the e-commerce transaction using the NFC communication link has completed. If the e-commerce transaction has not yet completed, control of process 1350 transitions to block 1361. If the e-commerce transaction has completed, then control of process 1350 transitions to block 1359.

A block 1359, host controller 1307 may issue a command to NFC module 1311 in order to change switch 1315 to connect to coil 1319 rather than to coil 1317. At the completion of block 1359, control of process 1350 reverts to decision block 1353.

At block 1361, a decision is made whether a time-out has occurred while waiting for the e-commerce transaction of block 1357 to finish. If the outcome of decision block is negative, then control of process 1350 reverts to block 1357. If the outcome of decision block is positive, then control of process 1350 transitions to block 1359.

Figure 14:
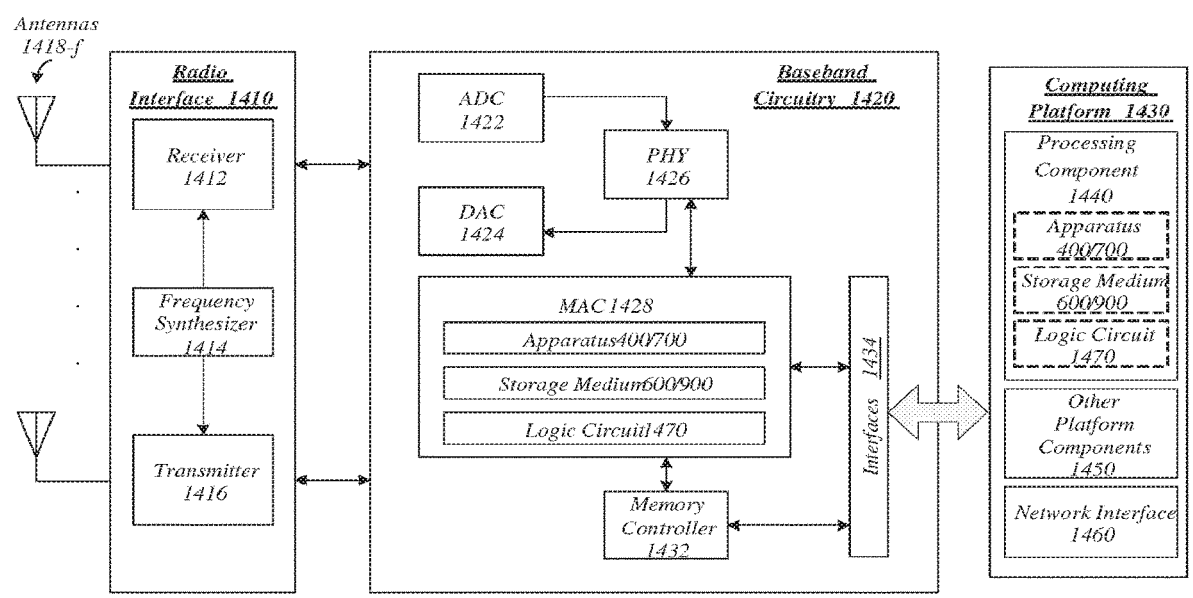
FIG. 14 illustrates an embodiment of a device.

FIG. 14 illustrates an embodiment of a device 1400 for use in a wireless communications system, such as an NFC system. Device 1400 may be suitable to implement various embodiments as described in FIGS. 1-13. Device 1400 may be implemented, for example, in mobile platforms such as tablets and smartphones. The logic circuit 1430 may include physical circuits to perform operations described for an NFC-enabled mobile platform. As shown in FIG. 14, device 1400 may include a radio interface 1410, baseband circuitry 1420, and computing platform 1430, although embodiments are not limited to this configuration.

The device 1400 may implement some or all of the structure and/or operations for an NFC-enabled mobile platform, the storage medium 1444, 1454 and/or logic circuit 1442 in a single computing entity, such as entirely within a single device. Alternatively, the device 1400 may distribute portions of the structure and/or operations for an NFC-enabled mobile platform, the storage medium 1444, 1454 and/or logic circuit 1442 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1410 may include a component or combination of components adapted for transmitting and/or receiving NFC signals, single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1410 may include, for example, a receiver 1412, a transmitter 1416 and/or a frequency synthesizer 1414. Radio interface 1410 may include bias controls, a crystal oscillator and/or one or more antennas 1418-$p$. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1456 for PHY link layer processing of respective receive/transmit signals. Baseband circuitry 1420 may include, for example, a processing circuit 1428 for medium access control (MAC)/data link layer processing. Baseband circuitry 1420 may include a memory controller 1432 for communicating with processing circuit 1428 and/or a computing platform 1430, for example, via one or more interfaces 1434.

In some embodiments, PHY processing circuit 1426 may include a frame construction and/or detection module, in combination with additional circuitry such as a buffer memory, to construct and/or deconstruct communication frames. Alternatively or in addition, MAC processing circuit 1428 may share processing for certain of these functions or perform these processes independent of PHY processing circuit 1426. In some embodiments, MAC and PHY processing may be integrated into a single circuit.

The computing platform 1430 may provide computing functionality for the device 1400. As shown, the computing platform 1430 may include a processing component 1440. In addition to, or alternatively of, the baseband circuitry 1420, the device 1400 may execute processing operations or logic for a UE, a base station, the storage medium 1444 and/or logic circuit 1442 using the processing component 1430. The processing component 1430 (and/or PHY 1426 and/or MAC 1428) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1400 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1400 described herein, may be included or omitted in various embodiments of device 1400, as suitably desired. In some embodiments, device 1400 may be configured to be compatible with protocols and frequencies associated one or more of the 3GPP LTE Specifications and/or IEEE 702.16 Standards for WMANs, and/or other broadband wireless networks, cited herein, although the embodiments are not limited in this respect.

Embodiments of device 1400 may be implemented using single input single output (SISO) architectures. However, certain implementations may include multiple antennas (e.g., antennas 1418-*p*) for transmission and/or reception using adaptive antenna techniques for beamforming or spatial division multiple access (SDMA) and/or using MIMO communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

An apparatus to provide switchable coils in a computing device may comprise a plurality of electrically conductive coils to transfer electromagnetic energy, a sensor coupled to a processor, the processor to select a coil from among the plurality of electrically conductive coils by use of the sensor, a switch to energize the selected coil, and a switch controller coupled to the switch and to the processor to control the switch.

With respect to such an apparatus, the plurality of coils comprising an inductive charging interface.

Such an apparatus may further comprise a communication interface between the processor to the plurality of electrically conductive coils, the plurality of coils comprising an interface for near-field communications (NFC).

With respect to such an apparatus, the plurality of coils arranged under a touch-screen user interface.

With respect to such an apparatus, the plurality of coils arranged along at least two major surfaces of the computing device.

With respect to such an apparatus, the sensor to sense a physical configuration of the computing device.

With respect to such an apparatus, the sensor to sense an operating state of the computing device.

With respect to such an apparatus, the sensor to sense a physical configuration of the computing device that is related to a change in operating state of the computing device.

With respect to such an apparatus, the sensor to sense a pattern of responses from the plurality of electrically conductive coils.

Such an apparatus may further comprise an application program monitor, to activate a predetermined coil upon detection of predetermined application program activity.

A system to provide switchable coils in a computing device may comprise a processor coupled to a memory, a plurality of electrically conductive coils to transfer electromagnetic energy, a sensor coupled to the processor, the processor to select a coil from among the plurality of electrically conductive coils by use of the sensor, a switch to energize the selected coil, and a switch controller coupled to the switch and to the processor to control the switch.

With respect to such a system, the plurality of coils may comprise an inductive charging interface.

Such a system may further comprise a communication interface between the processor to the plurality of electrically conductive coils, the plurality of coils comprising an interface for near-field communications (NFC).

With respect to such a system, the plurality of coils may be arranged under a touch-screen user interface.

With respect to such a system, the plurality of coils may be arranged along at least two major surfaces of the computing device.

With respect to such a system, the sensor may sense a physical configuration of the computing device.

With respect to such a system, the sensor may sense an operating state of the computing device.

With respect to such a system, the sensor may sense a physical configuration of the computing device that is related to a change in operating state of the computing device.

With respect to such a system, the sensor may sense a pattern of responses from the plurality of electrically conductive coils.

Such a system may further comprise an application program monitor, to activate a predetermined coil upon detection of predetermined application program activity.

At least one machine-readable medium may comprise a plurality of instructions that, in response to being executed on a computing device, may cause a controller to cause a plurality of electrically conductive coils to transfer electromagnetic energy, to receive data from a sensor coupled to the controller, to select a coil from among the plurality of electrically conductive coils by use of the data, to control a switch to energize the selected coil, and to communicate with a switch controller coupled to the switch and to the processor.

With respect to such a computer-readable storage medium, the plurality of coils may comprise an inductive charging interface.

Such a computer-readable storage medium may further comprise instructions that, when executed, cause a controller to communicate on a communication interface between the processor to the plurality of electrically conductive coils, the plurality of coils comprising an interface for near-field communications (NFC).

With respect to such a computer-readable storage medium, the plurality of coils arranged under a touch-screen user interface.

With respect to such a computer-readable storage medium, the plurality of coils arranged along at least two major surfaces of the computing device.

With respect to such a computer-readable storage medium, the sensor to sense a physical configuration of the computing device.

With respect to such a computer-readable storage medium, the sensor to sense an operating state of the computing device.

With respect to such a computer-readable storage medium, the sensor to sense a physical configuration of the computing device that is related to a change in operating state of the computing device.

With respect to such a computer-readable storage medium, the sensor to sense a pattern of responses from the plurality of electrically conductive coils.

Such a computer-readable storage medium may further comprise an application program monitor, to activate a predetermined coil upon detection of predetermined application program activity.

A method to provide switchable coils in a computing device may comprise providing a plurality of electrically conductive coils to transfer electromagnetic energy, selecting a coil from among the plurality of electrically conductive coils, by use of a sensor coupled to a processor, energizing the selected coil by use of a switch, and controlling the switch by use of a switch controller coupled to the switch and to the processor.

With respect to such a method, the plurality of coils may comprise an inductive charging interface.

Such a method may further comprise communicating between the processor and the plurality of electrically conductive coils, the plurality of coils comprising an interface for near-field communications (NFC).

With respect to such a method, the plurality of coils may be arranged under a touch-screen user interface.

With respect to such a method, the plurality of coils may be arranged along at least two major surfaces of the computing device.

With respect to such a method, the sensor sensing a physical configuration of the computing device.

With respect to such a method, the sensor sensing an operating state of the computing device.

With respect to such a method, the sensor sensing a physical configuration of the computing device that is related to a change in operating state of the computing device.

Such a method may further comprise the sensor sensing a pattern of responses from the plurality of electrically conductive coils.

Such a method may further comprise activating a predetermined coil upon detection of predetermined application program activity.

An apparatus to provide switchable coils in a computing device may comprise a means for providing a plurality of electrically conductive coils to transfer electromagnetic energy, a means for selecting a coil from among the plurality of electrically conductive coils, by use of a sensor coupled to a processor, a means for energizing the selected coil by use of a switch, and a means for controlling the switch by use of a switch controller coupled to the switch and to the processor.

With respect to such an apparatus, the plurality of coils may comprise an inductive charging interface.

Such an apparatus may further comprise a means for communicating between the processor and the plurality of electrically conductive coils, the plurality of coils comprising an interface for near-field communications (NFC).

With respect to such an apparatus, the plurality of coils arranged under a touch-screen user interface.

With respect to such an apparatus, the plurality of coils arranged along at least two major surfaces of the computing device.

With respect to such an apparatus, the sensor sensing a physical configuration of the computing device.

With respect to such an apparatus, the sensor sensing an operating state of the computing device.

With respect to such an apparatus, the sensor sensing a physical configuration of the computing device that is related to a change in operating state of the computing device.

With respect to such an apparatus, the sensor sensing a pattern of responses from the plurality of electrically conductive coils.

Such an apparatus may further comprise a means for activating a predetermined coil upon detection of predetermined application program activity.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Furthermore, in the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements.

In addition, the term "and/or" may mean "and," it may mean "or," it may mean "exclusive-or," it may mean "one,"

it may mean "some, but not all," it may mean "neither," and/or it may mean "both," although the scope of claimed subject matter is not limited in this respect. In the following description and/or claims, the terms "comprise" and "include," along with their derivatives, may be used and are intended as synonyms for each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the scope of the appended claims.

The invention claimed is:

1. An apparatus, comprising:
a sensor;
an antenna comprising a coil; and
a controller coupled with the antenna to receive command signals from a host controller in response to execution of an application by the host controller; the controller to perform wireless charging via the antenna in response to the command signals, the controller to activate wireless energy transfer via the antenna to transmit power to a receiving coil based on the command signals from the host controller, the command signals based on input from the sensor, and to perform near field communications via the antenna in response to the command signals, wherein performance of near field communications comprises transfer of communication signals;
wherein the apparatus comprises surfaces housing at least the controller and the host controller.

2. The apparatus of claim 1, further comprising the host controller coupled with the sensor to execute at least one application to generate the command signals.

3. The apparatus of claim 2, further comprising a display coupled with the host controller, wherein the display comprises a touch screen and the touch screen comprises sensors, wherein the sensor comprises one of the sensors of the touch screen.

4. The apparatus of claim 3, the controller to activate the antenna as an inductive charging interface based on the command signals from the host controller.

5. The apparatus of claim 2, the controller to receive a command signal from the host controller to use the antenna.

6. The apparatus of claim 2, further comprising a circuit board, the circuit board coupled with the host controller and one or more sensors, wherein the one or more sensors comprise the sensor.

7. The apparatus of claim 1, the controller to comprise an inductive charging interface and a near field communications interface.

8. The apparatus of claim 1, the antenna comprising more than one coil including the coil, the controller to associate one or more of the coils with modes of the apparatus.

9. The apparatus of claim 8, the controller to switch from a first coil of the one or more of the coils to a second coil of the one or more coils based on power efficiency.

10. The apparatus of claim 9, the first coil to become inactive for power efficiency.

11. The apparatus of claim 8, the controller to comprise an interface circuit, the interface circuit to comprise a switch to switch between coils of the more than one coil.

12. The apparatus of claim 1, the controller to comprise a near field communications (NFC) module.

13. A system, comprising:
a sensor;
a display;
a host controller coupled with the display to execute at least one application based on input from the sensor;
a second controller communicatively coupled with the host controller; and
an antenna comprising a coil;
the second controller to couple with the antenna to perform wireless charging with the antenna in response to the at least one application accessing the second controller for wireless charging, the second controller to activate wireless energy transfer via the antenna to transmit power to a receiving coil based on command signals from the host controller, the command signals based on input from the sensor, and to perform near field communications via the antenna in response to the at least one application accessing the second controller for near field communications, wherein performance of near field communications comprises transfer of communication signals;
wherein the system comprises surfaces housing at least the second controller and the host controller.

14. The system of claim 13, the second controller to comprise an inductive charging interface and a near field communications interface.

15. The system of claim 13, the antenna comprising more than one coil, wherein the second controller to associate one or more of the coils with modes of the system.

16. The system of claim 15, the second controller to comprise an interface circuit, the interface circuit to comprise a switch to switch between coils of the more than one coil.

17. The system of claim 13, the second controller to comprise a near field communications (NFC) module.

18. The system of claim 13, the second controller to activate the antenna as an inductive charging interface based on the command signals from the host controller.

19. The system of claim 13, further comprising a circuit board, the circuit board coupled with the host controller and one or more sensors, wherein the one or more sensors comprise the sensor.

20. The system of claim 13, wherein the display comprises a touch screen, wherein the touch screen comprises sensors, wherein the sensor comprises one of the sensors of the touch screen.

21. An apparatus comprising:
a near field communications (NFC) controller to communicatively couple with a host processor, the host processor to execute at least one application; and
an NFC interface to couple the NFC controller with the host processor, the NFC controller to couple with an antenna to perform wireless charging with the antenna in response to the at least one application accessing the NFC controller for wireless charging, the NFC controller to activate wireless energy transfer via the antenna to transmit power to a receiving coil, and to perform near field communications via the antenna in response to input from a sensor to cause the at least one application to access the NFC controller for near field communications, wherein performance of near field communications comprises transfer of communication signals.

22. The apparatus of claim 21, further comprising the antenna.

23. The apparatus of claim 21, the NFC controller to associate the antenna with modes of the apparatus.

24. The apparatus of claim 23, the NFC controller to associate one or more coils of the antenna with one or more of the modes, wherein the antenna comprises more than one coil.

25. The apparatus of claim 24, the NFC controller to couple with the antenna via a switch to switch between coils of the more than one coil.

26. The apparatus of claim 21, the NFC controller to receive a command signal from the host controller to use the antenna for wireless charging or near field communications.

27. The apparatus of claim 21, the NFC controller to comprise an inductive charging interface.

28. The apparatus of claim 27, the NFC controller comprising an NFC processor.

* * * * *